US011721868B2

(12) United States Patent
Yang et al.

(10) Patent No.: US 11,721,868 B2
(45) Date of Patent: Aug. 8, 2023

(54) BLOWER

(71) Applicant: Globe (Jiangsu) Co., Ltd, Jiangsu (CN)

(72) Inventors: Xudong Yang, Jiangsu (CN); Yunjie Shangguan, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 349 days.

(21) Appl. No.: 17/115,780

(22) Filed: Dec. 8, 2020

(65) Prior Publication Data

US 2021/0175574 A1 Jun. 10, 2021

(30) Foreign Application Priority Data

Dec. 9, 2019 (CN) .......................... 201911247753.1

(51) Int. Cl.
*H01M 50/247* (2021.01)
*A01G 20/47* (2018.01)
(Continued)

(52) U.S. Cl.
CPC .......... *H01M 50/247* (2021.01); *A01G 20/47* (2018.02); *A47L 5/14* (2013.01); *E01H 1/0809* (2013.01);
(Continued)

(58) Field of Classification Search
CPC ............. H01M 52/247; H01M 52/262; H01M 52/244; H01M 2220/30; H01M 50/247; H01M 50/262; H01M 50/244; A01G 20/47; A47L 5/14; E01H 1/0809; E01H 2001/0881
(Continued)

(56) References Cited

U.S. PATENT DOCUMENTS 9,035,596 B2 5/2015 Sugiura et al.
10,076,833 B2 * 9/2018 Tada .................... H01M 50/247
(Continued)

FOREIGN PATENT DOCUMENTS

CN 206619621 U 7/2017
WO 2017118276 A1 7/2017

OTHER PUBLICATIONS

Extended European Search Report of counterpart European Patent Application No. 20212781.7 dated Apr. 20, 2021.

*Primary Examiner* — Katina N. Henson

(57) ABSTRACT

The invention provides a blower. The blower includes: a main body extending in a longitudinal direction, a battery pack supporting member arranged on the main body, and a battery pack arranged on the battery pack supporting member, the battery pack supporting member is separable with respect to the main body, which includes a body forming a battery pack receiving portion and a mounting portion being coupled with the main body, the battery pack supporting member and the battery pack are detachably coupled to the main body. According to the blower of the invention, the battery pack supporting member is engaged with the main body, and a single battery pack or a dual battery packs can be installed by installing battery pack supporting members with different structures on the main body of the blower, which facilitates the switching between the single battery pack and the dual battery packs.

7 Claims, 5 Drawing Sheets

(51) Int. Cl.
    *H01M 50/262*     (2021.01)
    *H01M 50/244*     (2021.01)
    *E01H 1/08*     (2006.01)
    *A47L 5/14*     (2006.01)

(52) U.S. Cl.
    CPC ....... *H01M 50/244* (2021.01); *H01M 50/262* (2021.01); *E01H 2001/0881* (2013.01); *H01M 2220/30* (2013.01)

(58) Field of Classification Search
    USPC .......................................... 15/405; 429/121
    See application file for complete search history.

(56) References Cited

U.S. PATENT DOCUMENTS 10,439,415 B2     10/2019   Zhu et al.
  2011/0197389 A1*   8/2011   Ota ..................... H01M 10/488
                                                                      429/121

* cited by examiner

BLOWER

CROSS-REFERENCE TO RELATED INVENTIONS

This invention claims the priority of CN invention Serial No. 201911247753.1, filed on Dec. 9, 2019, the disclosures of which are hereby incorporated by reference in their entirety.

TECHNICAL FIELD

The invention relates to the field of garden tools, in particular to a blower equipped with a battery pack supporting member.

BACKGROUND ART

Hand-held garden tools, such as trimmer, hedge trimmer, chainsaw, blower, etc., usually use a detachable battery pack installed on main body as a power source. But battery pack supporting member and main body of the existing hand-held blowers are usually integrated, so only matching battery pack can be installed on a blower. When the blower needs to increase power and running time, it is necessary to use a single battery pack that provides high power but with a large structural size or a dual battery packs in series or parallel installed on the blower, but the existing battery pack supporting member cannot meet this requirement.

Therefore, it is necessary to provide a blower to solve the above problems.

SUMMARY OF INVENTION

The object of the present invention is to provide a blower which is convenient for assembling different battery packs.

In order to achieve the above object, the present invention adopts the following technical solution. A blower includes: a main body extending in a longitudinal direction, a battery pack supporting member arranged on the main body, and a battery pack arranged on the battery pack supporting member, the battery pack supporting member is separable with respect to the main body, which includes a body forming a battery pack receiving portion and a mounting portion being coupled with the main body, the battery pack supporting member and the battery pack are detachably coupled to the main body.

As a further improved technical solution of the present invention, the mounting portion includes a clip portion, and the main body includes a matching portion being coupled to the clip portion, and the clip portion is engaged with the matching portion.

As a further improved technical solution of the present invention, the battery pack supporting member further includes a seat for matching with the battery pack, and the seat is disposed in the battery pack receiving portion.

As a further improved technical solution of the present invention, the battery pack receiving portion future includes a pair of guide rails being parallel to each other, and the battery pack includes slide grooves for matching with the pair of guide rails, and the pair of guide rails are slidable engaging with and the slide grooves.

As a further improved technical solution of the present invention, the battery pack receiving portion is located on a longitudinal axis of the main body, and the pair of guide rails are symmetrical relative to the longitudinal axis.

As a further improved technical solution of the present invention, the battery pack receiving portion includes two sub-cavities, the two sub-cavities are symmetrically disposed on both two sides of the longitudinal axis of the main body, and each sub-cavity is assembled with the battery pack.

As a further improved technical solution of the present invention, the battery pack supporting member includes a first portion, a second portion, and a third portion that are engaged with each other, the first portion and the second portion are jointly mounted to the main body, the first portion and the third portion constitute one sub-cavity, the second portion and the third portion constitute another sub-cavity.

As a further improved technical solution of the present invention, the two sub-cavities are disposed on opposite sides of the longitudinal axis of the main body, and each sub-cavity.

As a further improved technical solution of the present invention, the mounting portion includes an auxiliary bolt, the battery pack supporting member is disposed at a rear end of the main body, and the battery pack and the battery pack supporting member are assembled together in a vertical direction, the battery pack receiving portion comprises a first opening for assembling the battery pack and a second opening for exposing most of the battery pack.

As a further improved technical solution of the present invention, the blower includes a holding portion extending upward from the main body for griping, and the battery pack supporting member is disposed below and behind the holding portion.

It can be known from the above technical solutions that the blower of the present invention clamps the battery pack supporting member to the main body. The battery pack supporting member of different structures can be installed on the main body of the blower to install a single battery pack or a dual battery pack, which is convenient for switching between the single battery pack and dual battery pack.

DESCRIPTION OF EMBODIMENT

In order to make the objectives, technical solutions, and advantages of the present invention clearer, the invention will be further described in detail below with reference to the accompanying drawings and specific embodiments.

The invention provides a blower, includes a main body extending in a longitudinal direction, a battery pack supporting member disposed on the main body, and a battery pack disposed on the battery pack supporting member.

Figure 1:
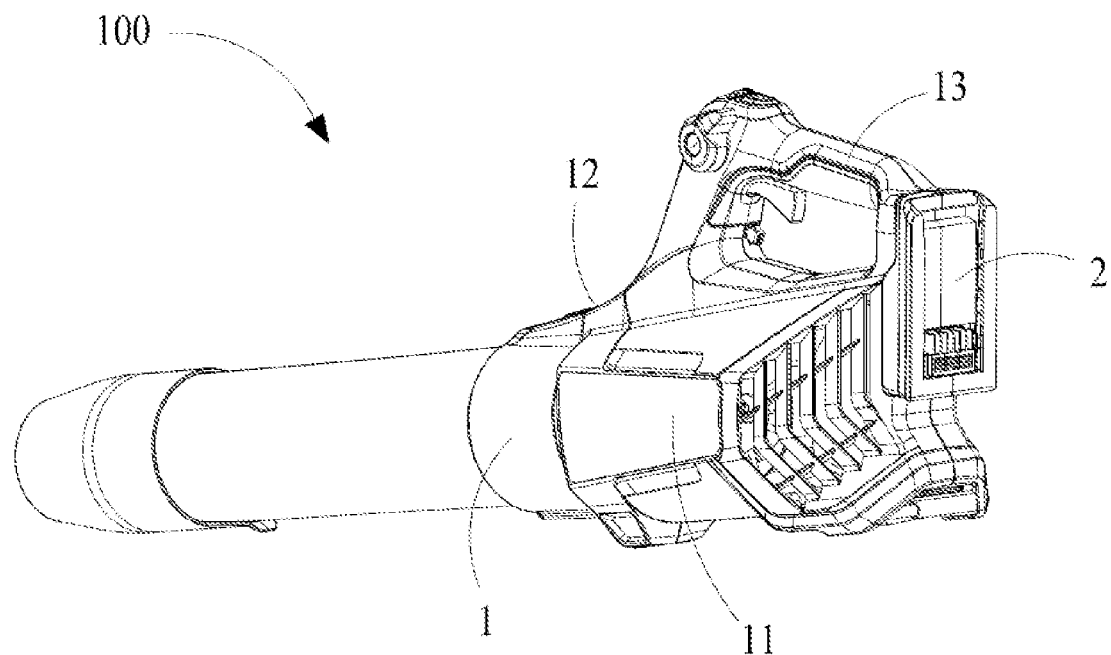
FIG. 1 is a perspective view of the blower according to the present invention.
Figure 2:
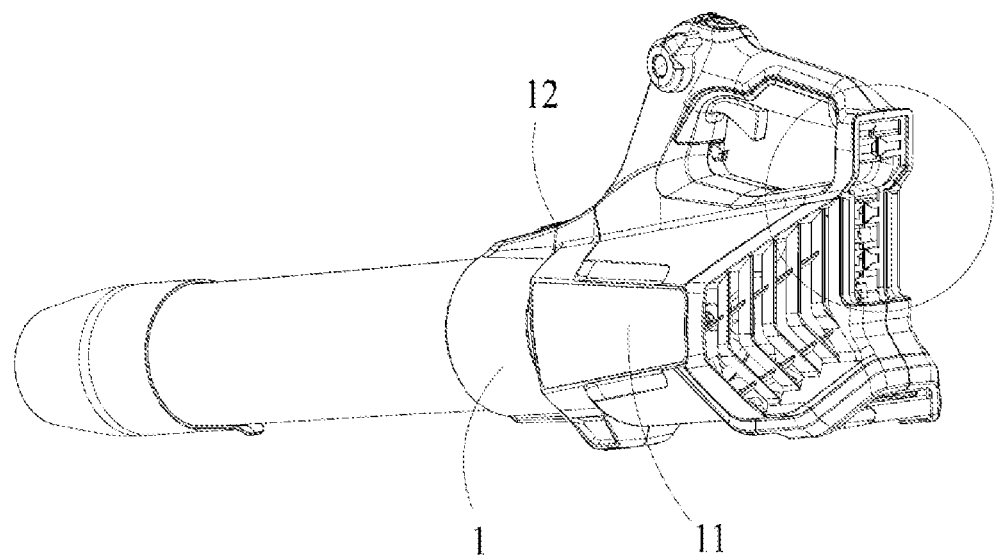
FIG. 2 is a perspective view of the main body of the blower in FIG. 1.

For the convenience of description, please refer to FIG. 1 and FIG. 2. The technical solution of the present invention will be described below with a blower 100. In other embodiments, the blower 100 may be replaced with other hand-held garden tools such as hedge trimmer, chainsaw, etc., which is not limited herein. The blower 100 includes a main body 1, a battery pack supporting member 2 disposed on the main body 1, and a battery pack disposed on the battery pack supporting member 2.

The main body 1 includes a left housing 11 and a right housing 12 being symmetrically arranged with each other. A symmetrical plane passing through the longitudinal axis is formed between the left housing 11 and the right housing 12. The left housing 11 and the right housing 12 extend upward to form a holding portion 13 for griping. A receiving cavity (not shown) for receiving the fan assembly is disposed in the main body 1. The battery pack supporting member 2 is disposed at a rear end of the main body 1, and is preferably disposed below and behind the holding portion 13 so that the battery pack does not prevent the operator from holding after the battery pack is installed. In this embodiment, the battery pack supporting member 2 is located on the longitudinal axis of the main body 1. And when the battery pack is connected to the blower 100, the blower 100 as a whole keeps the center of gravity in balance. In other embodiments, the installation position of the battery pack supporting member 2 may be adjusted according to the types of the blower, which is not limited herein.

Figure 4:
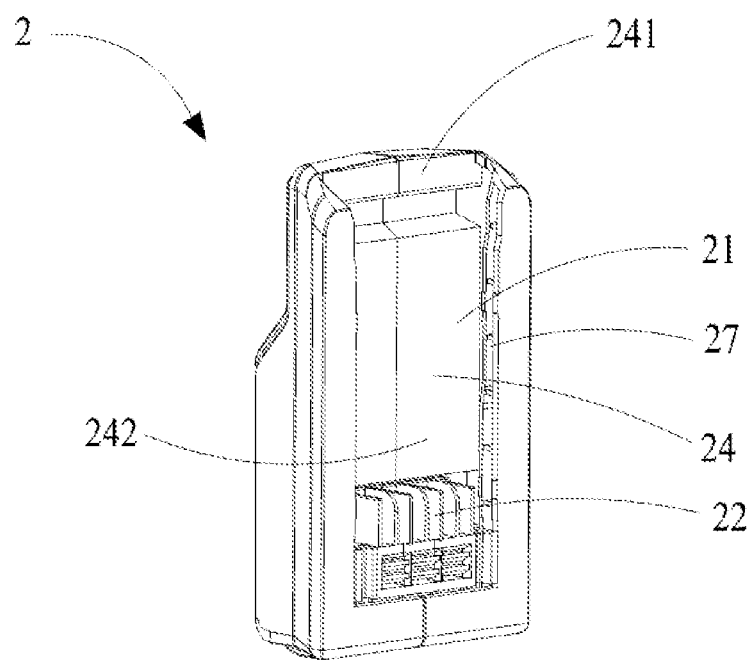
FIG. 4 is a perspective view of the battery pack supporting member in FIG. 1.
Figure 5:
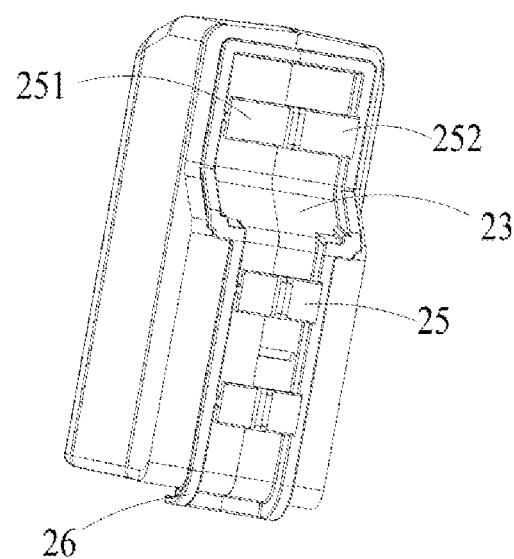
FIG. 5 is a perspective view of the battery pack supporting member in FIG. 4 in another direction.
Figure 6:
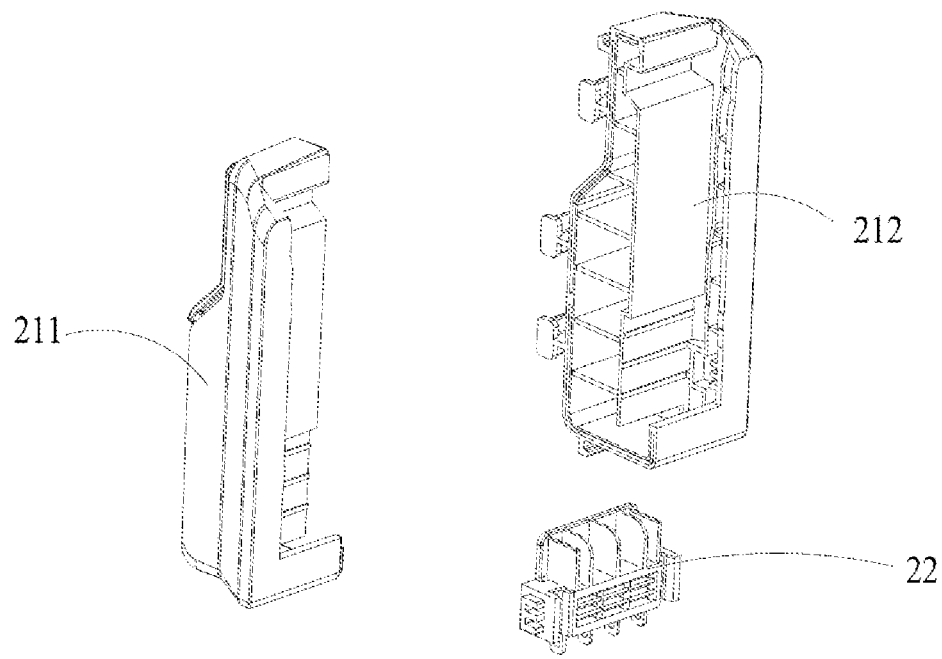
FIG. 6 is an exploded view of the battery pack supporting member in FIG. 4.

The battery pack supporting member 2 and the main body 1 being a split type configuration. Refer to FIG. 4 to FIG. 6, the battery pack supporting member 2 includes a main portion 21 of battery pack receiving portion 24, a mounting portion being coupled with the main body 1, and an seat 22 being disposed in the battery pack receiving portion 24. The battery pack and the battery pack supporting member 2 are detachably coupled to the main body 1. When the battery pack supporting member 2 is mounted on the main body 1, the seat 22 is electrically connected to a circuit board disposed in the main body, so as to provide power to the fan assembly of the blower when the battery pack is inserted into the battery pack supporting member 2. The battery pack receiving portion 24 includes a first opening 241 for assembling the battery pack and a second opening 242 for exposing most of the battery pack. Since most of the battery pack is exposed to the air environment during working, it is beneficial to the heat dissipation of the battery pack.

Figure 3:
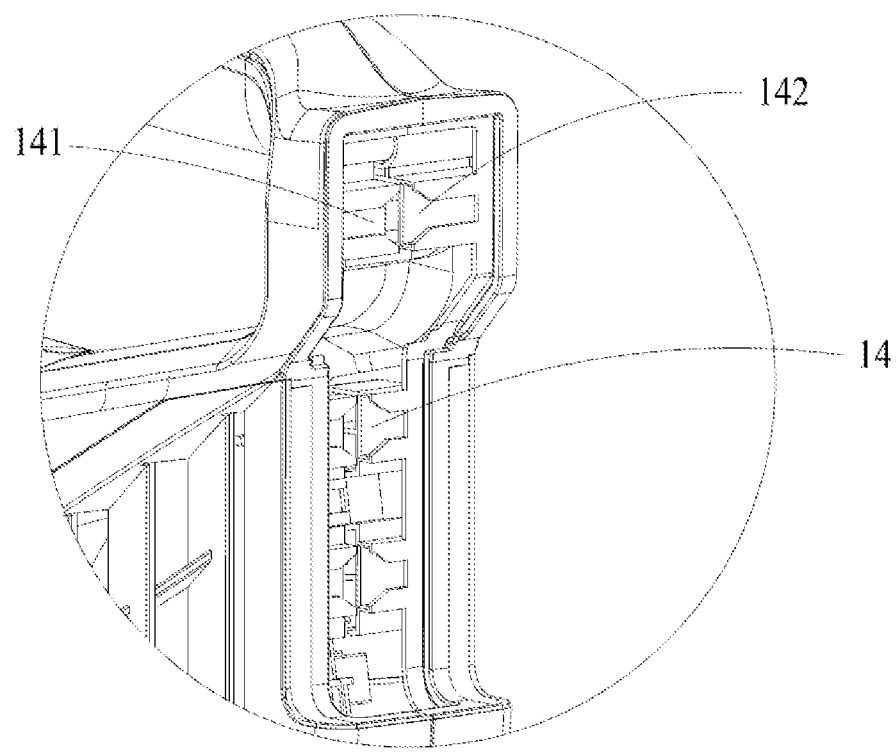
FIG. 3 is an enlarged view of the circled part in FIG. 2.

Please refer to FIG. 5 and FIG. 6, preferably, the main portion 21 includes a first portion 211 and a second portion 212, and they are engaged and secured by screws. One side of the first portion 211 and the second portion 212 as a whole being mounted on the main body 1, and the other side together being the battery pack receiving portion 24. Please refer to FIG. 2, FIG. 3 and FIG. 5, the mounting portion includes a clip portion 25, a matching portion 14 on the main body 1 being coupled to the clip portion 25. Specifically, the clip portion 25 is T-shaped. The clip portion 25 includes a left snap portion 251 disposed on the first portion 211 and a right snap portion 252 disposed on the second portion 212. When the first portion 211 is engaged with the second portion 212, the left snap portion 251 engaged with the right snap portion 252 being a whole, and a convex edge is disposed on the side where the left snap portion 251 and the right snap portion 252 are in contact.

The matching portion 14 is a slot opened on the main body 1. Specifically, the matching portion 14 includes a half slot 141 opened on the left housing 11 and a half slot 142 opened on the right housing 12. There is a gap between the half slot 141 and the half slot 142. When the clip portion 25 is engaged with the matching portion 14, the convex edge is located in the gap to limit the clip portion 25. The number of the clip portions 25 is preferably three and they are arranged parallel to each other along the vertical direction. Of course, in other embodiments, the clip portion 25 and the matching portion 14 may be disposed as other structures being engaged with each other, which is not limited herein.

The battery pack and the battery pack supporting member 2 are assembled in a vertical direction perpendicular to the longitudinal axis. Preferably, the mounting portion further includes a protruding rib 26 disposed along the outline thereof, and the protruding rib 26 extends to the bottom of the battery pack supporting member 2. The main body 1 is disposed a recess (not labeled) matching with the protruding rib 26. When the clip portion 25 and the matching portion 14 are engaged, the protruding rib 26 engages with the recess, so that the battery pack supporting member 2 and the main body 1 are stably combined, which ensured the stable connection of the battery pack when the blower 100 works. Preferably, the mounting portion further includes an auxiliary bolt to firmly fix the battery pack supporting member 2 to the main body 1.

As shown in FIG. 4, the first opening 241 is located at the top of the battery pack receiving portion 24. A guide rail 27 is further disposed in the battery pack receiving portion 24. The guide rail 27 includes two guide rails being parallel with each other. The battery pack includes a slide groove that matches with the guide rail 27, and the guide rail 27 slides up and down along the slide groove. That is, the battery pack is sliding from the first opening 241 to the battery pack supporting member 2 in a vertical downward direction. The power supply of the battery pack plugged into the seat 22 to provide power to the power circuit of the main body 1. When the battery pack needs to be removed, the battery pack can be slid from the bottom to the top, so that the battery pack can be easily removed or installed. Preferably, the guide rails 27 are symmetrically arranged with respect to the longitudinal axis of the main body 1.

Figure 7:
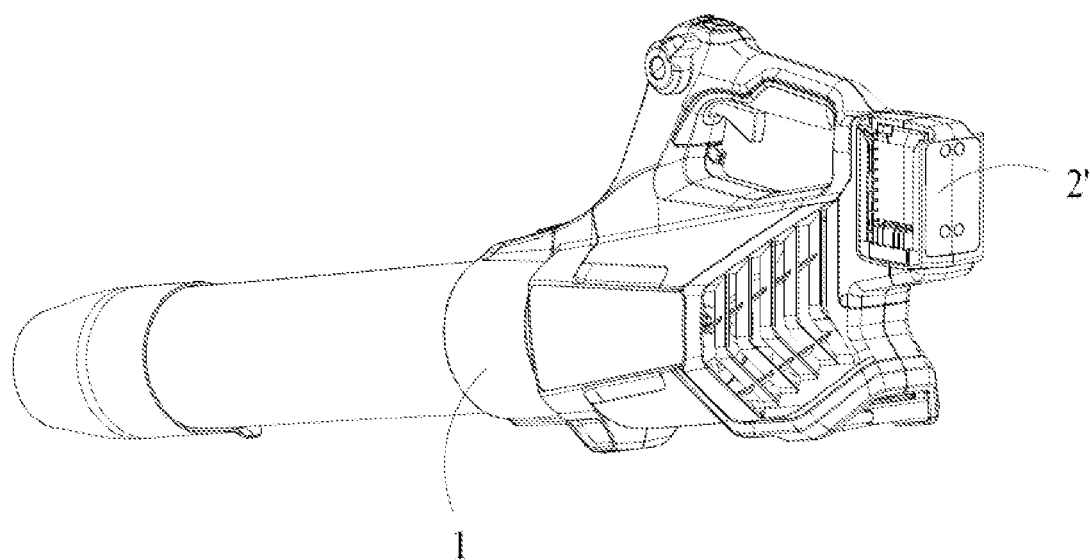
FIG. 7 is a perspective view of the blower according to another embodiment of the present invention.
Figure 8:
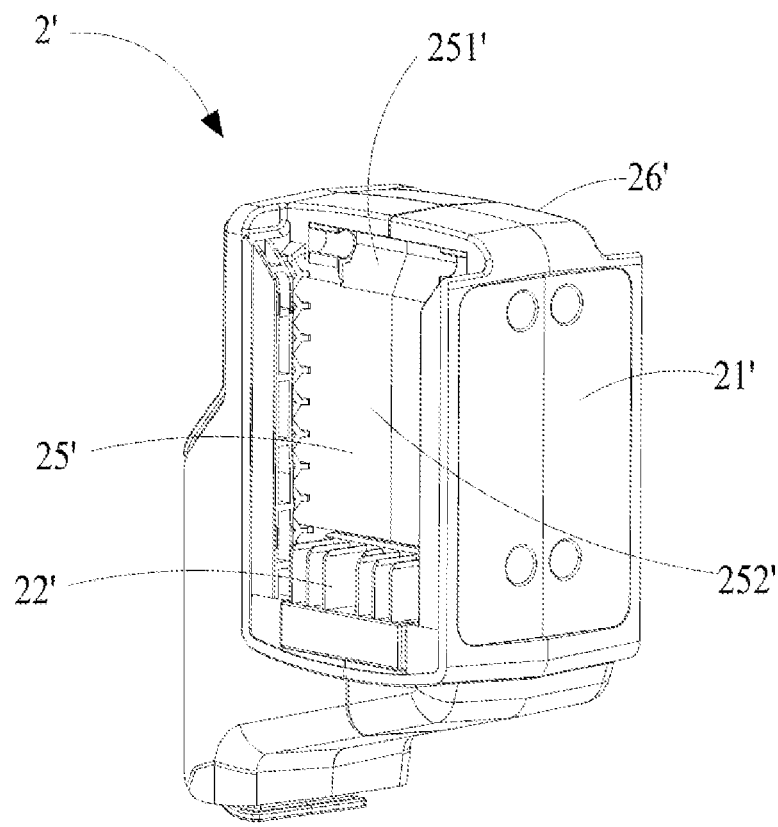
FIG. 8 is a perspective view of the battery pack supporting member in FIG. 7.
Figure 9:
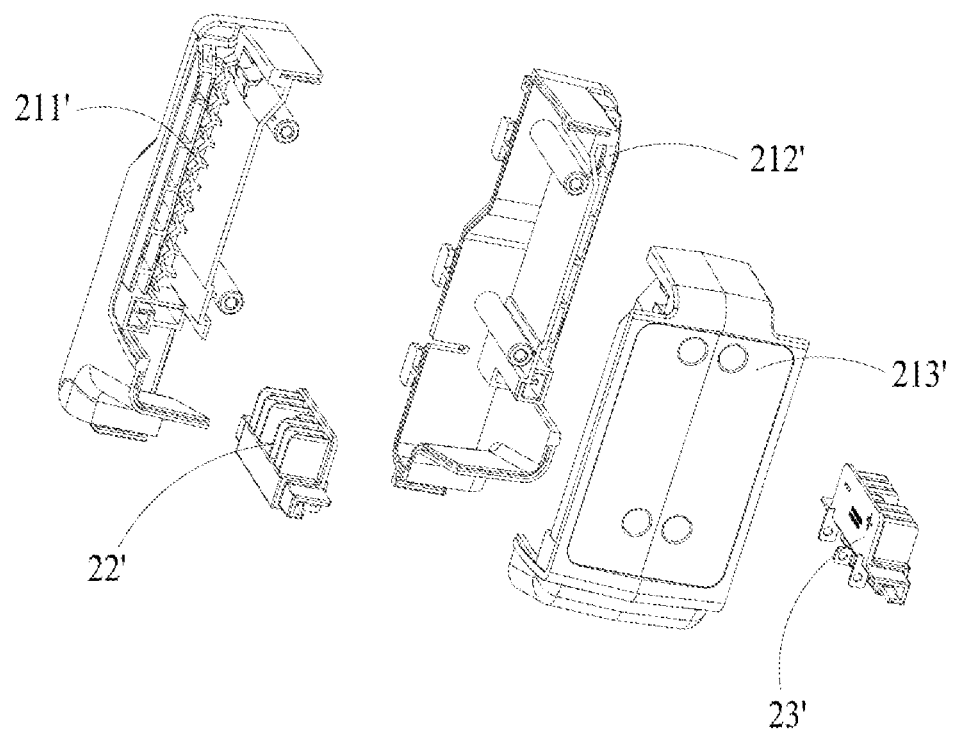
FIG. 9 is an exploded view of the battery pack supporting member in FIG. 8.

Please refer to FIG. 7 to FIG. 9, which provides a blower according to another embodiment of the present invention. The main body 1 is the same with the main body 1 in the above embodiment, which will not be described in detail herein. The battery pack supporting member 2' includes a main portion 21' of battery pack receiving portion for receiving a battery pack, a mounting portion, and a seat disposed in the battery pack receiving portion. The battery pack receiving portion includes two sub-cavities 25', 26', and the two sub-cavities 25', 26' are symmetrically disposed on two sides of the longitudinal axis on the main body 1 and are respectively assembled with the battery pack (not shown). Both the first sub-cavity 25 and the second sub-cavity 26' contain a seat 22', 23' located at a lower portion thereof and a guide rail for assembling the battery pack. The engagement of the battery pack receiving portion with the battery pack is the same as the embodiment above, which is not described herein. According to the requirements of use, the two battery packs can be installed or removed separately.

In this embodiment, the main portion 21' includes a first portion 211', a second portion 212', and a third portion 213' that are engaged with each other, and they are secured together by screws. The first portion 211' and the second portion 212' are mounted on the main body 1. The first portion 211' and the third portion 213' being a sub-cavity 25', and the second portion 212' and the third portion 213' being a sub-cavity 26'. In this embodiment, the structure and shape of a mounting portion are completely the same with the mounting portion in the above embodiment, and the matching of the mounting portion and the main body 1 is also the same with that in the above embodiment, which are not described herein. A first opening 251' for assembling the battery pack and a second opening 252' for exposing most of the battery pack were disposed on the sub-cavities 25', 26'. It should be noted that, in the present invention, the main portions 21, 21' being a splice configuration. In other embodiment, the main portions 21, 21' can also be an integral configuration, which is not limited herein.

In the present invention, when the battery pack is installed on the battery pack supporting members 2, 2', most of the battery pack is exposed to the external environment, which is beneficial to the heat dissipation of the battery pack. The specific shape of the battery pack supporting members 2, 2' and the number of battery packs are not limited, and it is only necessary to ensure that the battery pack supporting members have a mounting portion with uniform structure.

In summary, according to the blower of the present invention, the battery pack supporting member is engaged with the main body, and the same main body of the blower can be installed with different structures of battery pack supporting members for installing single battery pack or dual battery packs, which is convenient for switching between the single battery pack and dual battery pack. The battery pack supporting member of the present invention can be installed on different main body of blowers to increase the versatility of parts and reduce mold costs. In addition, the structure of the battery pack supporting member of the present invention is simple, making the overall configuration of the blower more compact and improving the comfort of the blower.

The above embodiment is only used to illustrate the present invention and not to limit the technical solutions described in the present invention. The understanding of this specification should be based on those skilled in the art, although the present invention has been described in detail with reference to the above embodiment. However, those skilled in the art should understand that those skilled in the art can still modify or equivalently replace the present invention, and all technical solutions and improvements that do not depart from the spirit and scope of the present invention should be covered within the scope of the claims of the present invention.

What is claimed is:

1. A blower comprising: a main body extending in a longitudinal direction, a battery pack supporting member arranged on the main body, and a battery pack arranged on the battery pack supporting member, the battery pack supporting member is separable with respect to the main body, which comprises a body forming a battery pack receiving portion and a mounting portion being coupled with the main body, the battery pack supporting member and the battery pack are detachably coupled to the main body; wherein the battery pack supporting member further comprises a seat for matching with the battery pack, and the seat is disposed in the battery pack receiving portion; wherein the battery pack receiving portion comprises two sub cavities, the two sub-cavities are symmetrically disposed on both two sides of the longitudinal axis of the main body, and each sub cavity is assembled with the battery pack; and wherein the battery pack supporting member comprises a first portion, a second portion, and a third portion that are engaged with each other, the first portion and the second portion are jointly mounted to the main body, the first portion and the third portion constitute one sub-cavity, the second portion and the third portion constitute another sub-cavity.

2. The blower according to claim 1, wherein the mounting portion comprises a clip portion, and the main body comprises a matching portion being coupled to the clip portion, and the clip portion is engaged with the matching portion.

3. The blower according to claim 1, wherein the battery pack receiving portion future comprises a pair of guide rails being parallel to each other, and the battery pack comprises slide grooves for matching with the pair of guide rails, and the pair of guide rails are slidable engaging with the slide grooves.

4. The blower according to claim 3, wherein the battery pack receiving portion future is located on a longitudinal axis of the main body, and the pair of guide rails are symmetrical relative to the longitudinal axis.

5. The blower according to claim 1, wherein the two sub-cavities are disposed on opposite sides of the longitudinal axis of the main body, and each sub-cavity comprises a pair of guide rails for assembling the battery pack.

6. The blower according to claim 1, wherein the mounting portion comprises an auxillary bolt, the battery pack supporting member is disposed at a read end of the main body, and the battery pack and the battery pack supporting member are assembled together in a vertical direction, the battery pack receiving portion comprises a first opening for assembling the battery pack and a second opening for exposing most of the battery pack.

7. The blower according to claim 6, wherein the blower comprises a handle extending upward from the main body, and the battery pack supporting member is disposed below and behind the handle.

* * * * *